Patented July 6, 1948

2,444,412

UNITED STATES PATENT OFFICE 2,444,412

MANNOGALACTAN MUCILAGES AND PROCESS FOR PRODUCING SAME

John W. Swanson, Appleton, Wis., assignor to The Institute of Paper Chemistry, Appleton, Wis., a corporation of Wisconsin No Drawing. Application March 19, 1945, Serial No. 583,661

10 Claims. (Cl. 260—209)

My invention relates to mucilaginous products and includes among its objects and advantages improvements in such products of the mannogalactan type, with a special reference to color and securing a wide range of viscosities.

Mannogalactan mucilages are polysaccharide products obtained from various leguminous seeds either by wet or dry milling methods. These products may be obtained in almost any common particle size but they are usually marketed in the range of 40–200 mesh. Chemically, they are composed, principally, of mannose and galactose linked in polymeric form. The ratio of mannose to galactose varies according to the species of seed from which the mucilage is derived. Insofar as we have investigated, the ratio of mannose to galactose is not a critical factor in the bleaching or conversion procedures. The commercial products usually contain in addition to the principal polysaccharide, 6–15% of water, 5–12% of protein and one percent of ash. Some of the products also contain indefinite amounts of seed coat material.

Among the sources of such mucilages are the seed of the flame tree, *Delonix regia*; guar seed, *Cyamopsis tetragonoloba*; tara seed, *Caesalpinia spinosa*; and locust beans, *Ceratonia siliqua*. These, and apparently any other mucilages having material mannogalactan content, are susceptible to beneficiation according to the invention.

Such mucilages have long been available for uses requiring only a poor quality material of high viscosity. I am aware that earlier attempts have been made to treat such mucilages but so far as I am aware they have not been successful. I believe this failure to have been due to carrying out the attempts in aqueous solution, which necessitated the ultimate removal of the treated mucilage by the expensive methods of evaporation, or precipitation by such an agent as alcohol. The difficulties in this respect were accentuated by the large volumes of water that had to be used because of extremely high viscosity of the solution, especially when alkaline. These earlier attempts also required the use of large quantities of relatively expensive organic chemicals such as sodium-p-toluenesulphochloramide (aktivin), carbon tetrachloride, trichlorethylene and, acetic anhydride, and yielded products of poor color containing all of the original impurities.

I have discovered a treatment which avoids the undesirable features above outlined and does produce a high quality product. Powdered mannogalactan mucilage can be suspended in a dilute aqueous borax solution, whereupon the mucilage does not pass into solution and does not yield a high viscosity even when large quantities are suspended in relatively small amounts of borax solution. With the mucilage in this suspended condition, the material can be treated with alkaline agents such as certain hypochlorites, or peroxides, for example, sodium or potassium hypochlorites, sodium or potassium peroxides and sodium or potassium perborates, and at the conclusion of the treatment the mucilage can be simply filtered off, washed if desired, with dilute borax solution, and subsequently dried and ground. This procedure is applicable to a simple bleaching action, if desired, for which purpose the oxidizing agent is added in an appropriate amount and the reaction allowed to proceed until a suitable color is attained.

The procedure is equally suitable for extending the action of the oxidizing agent to a point beyond bleaching whereupon the viscosity of the aqueous solution ultimately prepared from my treated mucilage is very greatly reduced as compared to the viscosity obtained with an untreated mucilage. This treated mucilage possesses exceptionally valuable properties for tubsizing and calender sizing of paper and as the adhesive for pigment coating of paper.

Example 1.—Bleaching

For the bleaching of a mannogalactan-containing mucilage such as that obtained from the seed of the flame tree, *Delonix regia*, two parts by weight of borax are dissolved in 100 parts of water and 10 parts of the powdered mannogalactan mucilage are added with agitation. This mixture is stirred for 15 minutes at 20–35° C. and then filtered and washed with 40–50 parts of 2% borax solution. The moist product is resuspended in 70 parts of one percent borax solution and 2–3% of available chlorine in the form of sodium hypochlorite solution is added with agitation. In about one hour at 20–30° C., the colored constituents will have been bleached. The mixture is then filtered and washed with 40–50 parts of one percent borax solution to remove the residual bleaching liquor, after which the product may be dried and ground for use.

The preliminary extraction with borax solution removes a considerable quantity of the coloring and proteinaceous matters which may be present and effects a large reduction in the amount of oxidizing agent necessary for bleaching to the desired degree. It will be obvious that with some grades of material containing only very small amounts of protein the preliminary extraction with borax solution may be found unnecessary.

This treated mucilage possesses exceptionally good beater sizing properties for certain high grade papers, whereas the original product could not be used in the manufacture of high grade papers because of poor color and many black specks. It also possesses equal or better paper making quantities with respect to bursting strength and folding endurance.

Example 2.—Converting

Dissolve two parts by weight of borax and one-half part of sodium carbonate in 100 parts of water. To this solution, 10 parts of powdered guar mucilage are added with agitation. Steam is then injected, if necessary, to bring the temperature to 35-40° C. and the mixture is held at this temperature for at least 15 minutes during which adequate stirring is continued to maintain suspension and circulation of the mucilage. The mixture is filtered and the product washed with 50 parts of 2% borax solution to remove residual protein. The moist mucilage is resuspended in 70 parts of one percent borax solution and sufficient stable sodium hypochlorite solution is added with stirring to furnish 10-14% of available chlorine on the weight of mucilage. The amount of chlorine depends upon the viscosity desired in the final product. The reaction is allowed to continue until 95-98% of the available chlorine has been consumed. This requires about six hours at 30° C. When this point is reached, the product is filtered off, washed with 50 parts of 2% borax solution to remove the residual bleach liquor and then dried and ground.

Example 3.—Converting

Dissolve two parts by weight of borax and one-half part of sodium carbonate in 100 parts of water. To this solution, 10 parts of the powdered guar mucilage are added with agitation. Steam is injected, if necessary to raise the temperature to 35-40° C. and the mixture is held at this temperature for at least 15 minutes during which time adequate stirring is continued to maintain suspension and circulation of the mucilage. The mixture is filtered and the product washed with 50 parts of 2% borax solution to remove residual protein. The moist mucilage is resuspended in 70 parts of one percent borax solution and sufficient hydrochloric acid (sp. gr. 1.18) is slowly added in a fine stream with vigorous stirring to bring the mixture to pH=8.0. Sufficient sodium hypochlorite solution to furnish 12-14% of available chlorine on the weight of mucilage is measured out and cooled to 5-10° C. Then hydrochloric acid (sp. gr. 1.18), also cooled to the same temperature, is slowly added with stirring to the sodium hypochlorite solution in a sufficient quantity to neutralize the sodium hydroxide present in excess of that required by the ratio $$\frac{NaOH}{Chlorine} = 1.13$$

This solution is immediately added to the mucilage suspension with stirring. A careful check on the pH is then maintained and if the pH should go below 7.5, small additions of strong alkali are made to return the pH to 7.5. After about one hour, when 95-98% of the chlorine has been consumed, the mixture is filtered and the product is washed with 40-50 parts of two percent borax solution to remove the residual bleach liquor and then it is dried and ground.

Example 4.—Tubsizing

I have found this treated mucilage to possess exceptionally good tubsizing properties for paper and paperboard. Five to six parts of the converted mucilage are slurried in 100 parts of water and sufficient hydrochloric acid is added with stirring to lower the pH to 5.5. Steam is then injected and the temperature is raised to 80° C. and held there for about 15 minutes. The solution is diluted to the desired mannogalactan concentration and used as a tubsize at the desired temperature. Comparative tests have indicated that a tubsizing solution containing 3.5% of mucilage according to the foregoing example, when applied to a 100% rag stock at 50° C. increased the bursting strength 42% compared with the same paper without any mucilage, whereas a good commercial tubsizing starch in 5% concentration only gave an increase of 28.1%. Also the increase in folding endurance was equal or better with the 3½% mucilage solution compared with the 5% starch solution.

Example 5.—Pigment coating

As a result of further experiments, I have found that my converted mannogalactan mucilage may be used as the adhesive in the pigment coating of paper. In this application, the mucilage has given Dennison wax pick tests equivalent to a high grade casein at the same concentration.

Six to eight parts of converted mucilage are slurried in 100 parts of water and sufficient hydrochloric acid is added with stirring to lower the pH to 5.5. Steam is then injected and the temperature is raised to 80° C. and held there for about 15 minutes. The solution is cooled to 35-40° C. and the pH adjusted to 6.0 with alkali. The mucilage solution is then added to a clay slip having a pH not substantially above 6.5 and the mixture is used for coating paper in the usual manner. Coatings made in this manner are not water insoluble but they may be made insoluble by spraying, dipping or otherwise treating the coated sheet with any mild alkaline agent such as borax, sodium bicarbonate, ammonia or ammonium hydroxide. The pH coating mixture should be kept at or below 6.5 until it is applied to the paper. If, for any reason, the pH should happen to rise beyond this point the addition of a small amount of acid will bring it down again and thus prevent such an increase in viscosity as would interfere with application.

The hypochlorite solutions used in the foregoing examples are made by dissolving caustic soda (sodium hydroxide) in water and passing in chlorine gas until the desired concentration of available chlorine is attained. The ratio of titratable alkali to available chlorine in the solution affects the stability of the reagent. This ratio should be kept above 1.126 (for sodium hypochlorite) if the solution is to be kept for several hours or more before using. On the other hand, a large excess of alkali is undesirable because it slows down the rate of bleaching and conversion. I have found a variation of this ratio between 1.16-1.40 to work quite well. The higher the ratio in the reaction mixture, the slower is the reaction until very strongly alkaline mixtures are used, for example, one-three normal in sodium or potassium hydroxide. In media of the latter concentration, the reaction again proceeds more rapidly. To prepare my hypochlorite solution, I usually start with a 3 normal solution of sodium hydroxide and pass in chlorine gas (with cooling)

until a concentration of 8.5–9.0% of available chlorine is reached. This solution will then be in the proper ratio range.

In general both the bleaching and the conversion reactions are best carried on at temperatures in the range of 25–60° C., and the specific temperatures given in the example are those at which the best results have been obtained so far. The higher temperatures give lower yields of final product, but apparently of unimpaired quality. This is believed to be due to solubility of the product in the borax solution. Lower temperatures slow down the reaction and thereby lengthen the reaction time unnecessarily. During the reaction, the temperature usually rises about 4° to 6° C. and then slowly subsides unless heated further externally.

The pH at which the reaction takes place has a bearing on the speed of reaction and yield of product. At a starting pH of 10–12, the conversion reaction requires about 6 hours for completion (Example 2). Adjustment of the pH of the components to 8.0–8.5 just prior to or immediately following the mixing will enable the reaction to proceed to completion in one hour (Example 3). The reaction takes place very rapidly at a pH of 7.5 but a mixture at this pH must be controlled very carefully. It is characteristic that the pH steadily decreases during the reaction due to the formation of acidic substances. If the pH is allowed to go below 7.2 a considerable loss in yield of product occurs through solubilization of the mucilage, and the entire mass may set up to a solid gel. Agitation and circulation of the reaction mixture is more difficult at lower pH values because more extensive hydration of the mucilage occurs even though appreciable solubilization does not occur above a pH of 7.3.

The borax solutions used for the preliminary extraction of the proteinaceous matters and filtrates from the conversion and washing procedures can be used repeatedly for about three successive extractions before they become unfit for further use. At this stage, it is advantageous to acidify the waste mixture and recover the precipitated protein.

The final product of Example 2 is closely similar to that of Example 3, but in Example 2, the reaction is at an average pH between about 8.5 and about 12.0. At these values the reaction is much slower but it does not need to be closely watched.

Commercial mill operations with the tub-sizing of Example 4 have indicated that the product is the equivalent of several times its weight of ordinary starch, when other conditions are kept substantially the same.

The Dennison wax pick test referred to in connection with Example 5 is well known and widely used. It is set forth in detail in "Paper Trade Journal," vol. 109, No. 12, pp. 36–38, of September 21, 1939.

Without further elaboration, the foregoing will so fully explain the invention that others may readily adapt the same for use under various conditions of service.

I claim:

1. A method of conditioning mannogalactan mucilages which comprises: forming a filterable suspension of said mucilage in an aqueous borax solution containing about 2% borax, substantially without dissolving said mucilage; filtering and washing said suspended material to eliminate coloring and proteinaceous material; re-suspending the residue in one percent borax solution; exposing the suspended mucilage at temperatures not exceeding 40° C. to the action of sodium hypochlorite, in amounts up to about 2–3% of available chlorine; filtering and washing the bleached material and drying and grinding the mucilage.

2. A method of conditioning mannogalactan mucilages to secure a product of low viscosity, which comprises: forming a filterable suspension of said mucilage in an aqueous borax solution, substantially without dissolving said mucilage; filtering and washing said suspended material to eliminate coloring and proteinaceous material; re-suspending the residue in aqueous borax solution; exposing the suspended mucilage at temperatures not exceeding 40° C. to the action of sodium hypochlorite in amounts up to about 10–14% of available chlorine; and filtering and washing the mucilage.

3. A method of conditioning mannogalactan mucilages which comprises: forming a filterable suspension of said mucilage in an aqueous borax solution, substantially without dissolving said mucilage; filtering and washing said suspended material to eliminate coloring and proteinaceous material; re-suspending the residue in aqueous borax solution; exposing the suspended mucilage at temperatures not exceeding 40° C., to the action of sodium hypochlorite, in amounts up to about 2–3% of available chlorine; and filtering and washing the bleached material.

4. A method of conditioning mannogalactan mucilages which comprises: forming a filterable suspension of said mucilage in an aqueous borax solution, substantially without dissolving said mucilage; filtering and washing said suspended material to eliminate coloring and proteinaceous material; re-suspending the residue in aqueous borax solution; and exposing the suspended mucilage to the action of an alkaline bleaching agent.

5. A method of conditioning mannagalactan mucilages which comprises: forming a filterable suspension of said mucilage in an aqueous borax solution substantially without dissolving said mucilage; exposing the suspended mucilage to the action of sodium hypochlorite in amounts up to about 2–3% of available chlorine; filtering and washing the bleached material.

6. A method of conditioning mannogalactan mucilages which comprises: forming a filterable suspension of said mucilage in an aqueous borax solution substantially without dissolving said mucilage; exposing the suspended mucilage to the action of an alkali bleaching agent.

7. A method of conditioning mannogalactan mucilages to secure final products of lowered viscosity which comprises: forming a filterable suspension of said mucilage in an aqueous borax solution substantially without dissolving said mucilage; exposing the suspended mucilage to the action of sodium hypochlorite, in amounts up to about 10–14% of available chlorine; filtering and washing the mucilage.

8. A method of conditioning mannogalactan mucilages which comprises: forming a filterable suspension of such mucilage substantially without dissolving said mucilage; exposing the suspended mucilage to the action of sodium hypochlorite; and filtering and washing the mucilage.

9. The mucilage product produced by the process of claim 2, the aqueous dispersions of said product being characterized by relatively low viscosities.

10. The mucilage product produced by the process of claim 8, the aqueous dispersions of said product being characterized by relatively low viscosities.

JOHN W. SWANSON.

REFERENCES CITED

The following references are of record in the file of this patent:

UNITED STATES PATENTS

| Number | Name | Date |
|---|---|---|
| 1,063,118 | Castle | May 27, 1913 |
| 1,339,489 | Weiss | May 11, 1920 |
| 1,718,837 | Schorger | June 25, 1929 |
| 2,073,616 | Acree | Mar. 16, 1937 |

Certificate of Correction

Patent No. 2,444,412.

July 6, 1948.

JOHN W. SWANSON

It is hereby certified that errors appear in the printed specification of the above numbered patent requiring correction as follows: Column 3, line 9, for the word "quantities" read *qualities*; column 6, line 55, claim 6, for "alkali" read *alkaline*; and that the said Letters Patent should be read with these corrections therein that the same may conform to the record of the case in the Patent Office.

Signed and sealed this 21st day of September, A. D. 1948.

[SEAL]

THOMAS F. MURPHY,
*Assistant Commissioner of Patents.*